United States Patent [19]
Falk

[11] Patent Number: 4,766,588
[45] Date of Patent: Aug. 23, 1988

[54] MULTIPLEXER AND DEMULTIPLEXER COMPRISING OPTICAL SWITCHES AND COMMON ELECTRODES

[75] Inventor: Robert A. Falk, Renton, Wash.

[73] Assignee: The Boeing Company, Seattle, Wash.

[21] Appl. No.: 912,939

[22] Filed: Sep. 29, 1986

[51] Int. Cl.$^4$ ............................................... H04B 9/00
[52] U.S. Cl. ......................................... 370/4; 350/96.13
[58] Field of Search .............. 370/4; 350/96.13, 96.15; 455/618, 612

[56] References Cited

U.S. PATENT DOCUMENTS 4,198,116  4/1980  Papuchon .......................... 350/96.14
4,608,682  8/1986  Nagashima et al. ..................... 370/4

FOREIGN PATENT DOCUMENTS 0254991  12/1985  Japan ....................................... 370/4

Primary Examiner—Robert L. Griffin
Assistant Examiner—Leslie Van Beek
Attorney, Agent, or Firm—Christensen, O'Connor, Johnson & Kindness

[57] ABSTRACT

An arrangement for optical multiplexing and demultiplexing. The multiplexer comprises an optical output waveguide and a plurality of optical input waveguides coupled to the output waveguide by nonblocking optical switches. An electrical activation signal at a switch causes light entering the switch through the associated input waveguide to appear on the output waveguide. The activation signals are provided by a pulse traveling down an electrode past the optical switches, such that parallel input signals on the input waveguides are time multiplexed onto the output waveguide to produce a serial output signal. A similar arrangement is provided for a demultiplexer comprising one input waveguide and a plurality of output waveguides.

15 Claims, 4 Drawing Sheets

MULTIPLEXER AND DEMULTIPLEXER COMPRISING OPTICAL SWITCHES AND COMMON ELECTRODES

FIELD OF THE INVENTION

The present invention relates to integrated optical components and, in particular, to integrated optical components for performing time division multiplexing and demultiplexing.

BACKGROUND OF THE INVENTION

Optical data transfer systems have an inherent transfer rate capability in excess of 100 gigabits per second. Electronic data transfer systems, on the other hand, are limited to transfer rates of roughly 1 gigabit per second, due to component switching times. Combinations of the above two systems into an electro-optic data transfer system, such as optical communication links, computer data links, etc., are presently limited by the slower electronic transfer rates.

One approach to obtaining a high-performance electro-optic data transfer system is to utilize parallel-to-serial multiplexing and serial-to-parallel demultiplexing of the data, wherein the slower electronic data transfer systems run in parallel, and the higher speed optical data transfer systems comprise fast serial data channels between the multiplexers and demultiplexers. Such a system has a natural applicability to most data transfer tasks in which an N bit binary word is generated. Each such word can be sent via N parallel electronic data transfer systems, each operating on one of the N bits. In this case, the serial optical data transfer system would run at a rate N times that of the individual electronic systems.

Prior systems for performing optical multiplexing and demultiplexing operations have possessed a number of limitations. One limitation is that prior arrangements have not been adapted for implementation using integrated optics technology. A second limitation of prior systems is that they have implemented the multiplexing or demultiplexing operations using blocking optical switches. A blocking optical switch is a switch that either transmits or blocks an optical input pulse. The use of blocking optical switches requires the attendant use of power dividers, and therefore requires higher power levels than optimum. Finally, a limitation of prior systems has been that such systems have been implemented using a tree or branching architecture in which, for example, an optical input signal is switched between one of two paths, and each of such paths is then input into another switch which again divides or switches the pulse between one of two output paths, etc. The coordination of the switching signals in such systems can be a challenging and difficult task.

SUMMARY OF THE INVENTION

The present invention provides an improved arrangement for multiplexing and demultiplexing optical signals. A multiplexing device according to the present invention comprises an optical output waveguide, a plurality of optical input waveguides, and a plurality of nonblocking optical switches. Each optical switch couples one of the input waveguides to the output waveguide. Each optical switch also includes means for receiving an electrical activation signal which, when present, causes light entering the optical switch through the associated input waveguide to pass through the optical switch into the output waveguide. The activation means provides activation signals to the optical switches, such that parallel optical input signals on the input waveguides are time multiplexed onto the output waveguide to produce a serial optical output signal. In a preferred embodiment, the activation means comprises a pair of coplanar traveling wave electrodes positioned along the output waveguide adjacent the optical switches, and means for launching an electrical pulse down the electrodes.

In a demultiplexer embodiment, the device of the present invention comprises an optical input waveguide, a plurality of optical output waveguides, and a plurality of nonblocking optical switches. Each optical switch couples one of the output waveguides to the input waveguide. Each optical switch includes means for receiving an electrical activation signal which, when present, causes light entering the optical switch through the input waveguide to pass through the optical switch onto the associated output waveguide. The activation means provides activation signals to the optical switches, such that a serial optical input signal on the input waveguide is time demultiplexed to produce parallel optical output signals on the output waveguides. The demultiplexer may also include feedback means for controlling the repetition rate of the activation signals such that the activation signals are synchronized to the input signal.

DETAILED DESCRIPTION OF THE INVENTION

Figure 1:
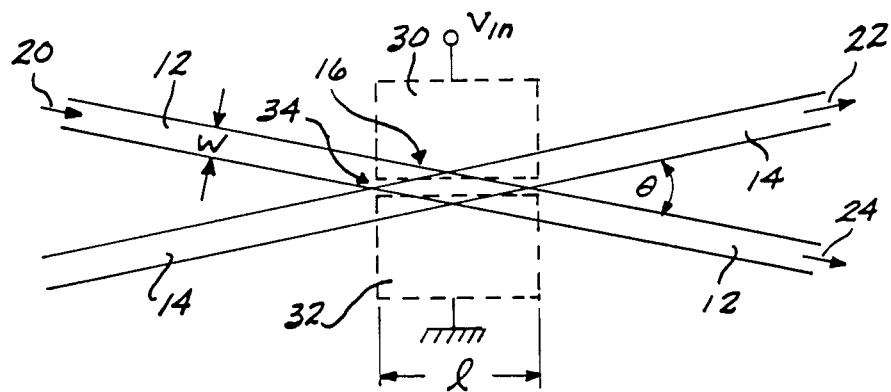
FIG. 1 is a schematic view of an X-crossing switch.
Figure 2:
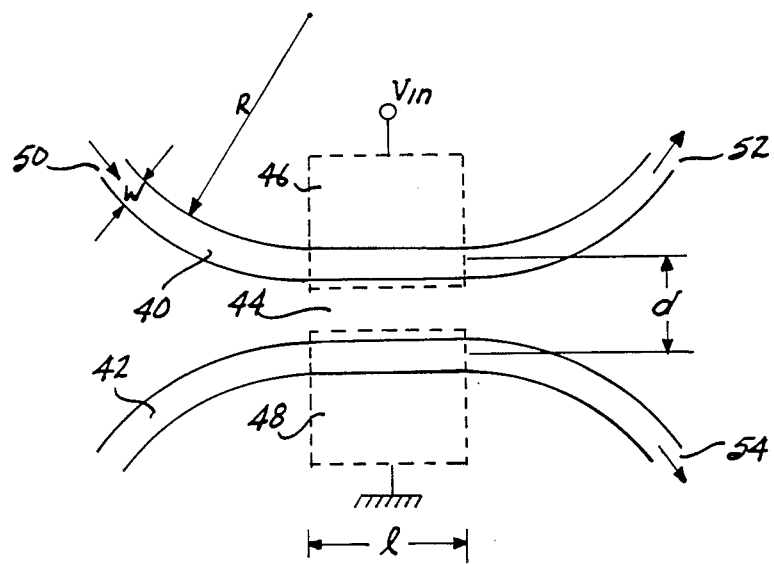
FIG. 2 is a schematic view of a directional coupler switch.

The optical multiplexing and demultiplexing devices of the present invention are preferably implemented using integrated optics technology, and in particular using nonblocking optical switches formed on an electro-optic substrate. Two preferred embodiments of nonblocking optical switches are shown in FIGS. 1 and 2. FIG. 1 depicts an X-crossing switch in which a pair of optical waveguides 12 and 14 are formed on a suitable substrate. The waveguides cross at intersection area 16 and then proceed to diverge from one another at angle $\theta$. A pair of electrodes 30 and 32 are formed bordering and partly overlapping intersection area 16, with a small gap 34 between the electrodes. In the absence of an applied electrical field, an optical signal input at port 20 of waveguide 12 would proceed along waveguide 12 and exit from the switch at port 24. However, when a suitable voltage is applied across electrodes 30 and 32, the electric field created in gap 34 changes the index of refraction of the electro-optic substrate, such that an optical signal that is input at port 20 appears at port 22 rather than port 24. Although the left-hand portion of optical waveguide 14 does not play a direct role in the operation of the switch, this waveguide is required for impedance matching at the intersection between the waveguides.

FIG. 2 illustrates a directional coupler optical switch that also operates in a nonblocking manner. In the directional coupler switch, optical waveguides 40 and 42 approach one another without actually crossing at interface area 44. Electrodes 46 and 48 are provided bordering area 44. In the absence of an electric field, an optical signal input at port 50 will appear at port 52. However, when a voltage is applied across the electrodes, the electric field in interface area 44 changes the index of refraction of the electro-optic substrate, such that an optical signal input to optical waveguide 40 at port 50 is coupled into optical waveguide 42 and appears at port 54.

For both of the optical switches shown in FIGS. 1 and 2, a suitable waveguide width W is 6 microns, assuming that an optical wavelength is on the order of 1.3 microns. A suitable interaction (i.e., electrodes) length l in the intersection or interface area is 1 millimeter. These choices fix the divergence angle $\theta$ for the X-crossing switch at about 0.8 degrees. A suitable waveguide separation d for the directional coupler switch is 8 microns. Finally, to avoid excessive radiation losses, the smallest allowable bend radius R in the directional coupler switch should be on the order 10 centimeters.

Figure 3:
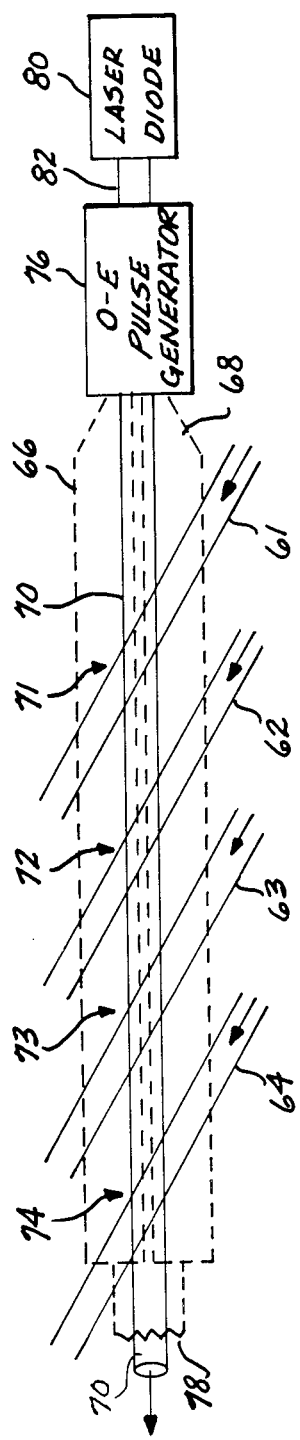
FIG. 3 is a schematic diagram of a multiplexer according to the present invention.

FIG. 3 sets forth an example of a 4-to-1 optical multiplexer implemented according to the present invention using X-crossing switches. The multiplexer comprises four input optical waveguides 61-64 and a single optical output waveguide 70. A 4-to-1 multiplexer is illustrated herein for convenience, it being understood that the arrangements of the present invention are advantageous for all multiplexing and demultiplexing systems having ratios of 3-to-1 or higher, and that the illustrated four-bit devices could readily be extended to higher multiplexing and demultiplexing ratios. Each of input waveguides 61-64 intersects output waveguide 70, to form X-crossing switches 71-74, respectively. Electrical operation of the switches is effected by means of a pair of traveling wave electrodes 66 and 78 that are coupled at one end to optoelectric pulse generator 76. Pulse generator 76 is in turn coupled to laser diode 80 by optical waveguide 82. The traveling wave electrodes are terminated at their opposite ends by terminating resistor 78. The function of pulse generator 76 and laser diode 80 are to generate a very short duration electrical pulse and launch such pulse down electrodes 66 and 68. In this technique for generating short pulses, laser diode 80 has a negative bias, and this bias is combined with a strong RF drive to obtain short (30 picosecond) electrical pulses with a repetition rate that is controlled by the RF frequency. Generation of short electrical pulses by this method is described in a paper by N. Onadera et al. (IEEE J. Quant. Elect., QE-21, 568 (1985)). In the alternative, a mode locked laser may be used to generate the electrical pulses. However, the illustrated technique has the advantages of reduced complexity and an easily controlled repetition rate, and is therefore preferred.

In a typical application in an electro-optic data transfer system, each of input optical waveguide 61-64 will be coupled to a suitable optical signaling device, such as a laser diode or LED. Each of such signaling devices will be adapted for converting one bit of a four-bit digital signal into an optical signal, resulting in a four "bit" optical signal on input waveguides 61-64. The multiplexer shown in FIG. 3 converts this four-bit parallel signal into a serial signal on output waveguide 70. A parallel in, serial output (PISO) conversion is initiated by pulse generator 76 when the pulse generator launches an electrical pulse down electrodes 66 and 68. When such pulse reaches switch 71, it causes any optical pulse present on input waveguide 61 at switch 71 to form an optical output pulse on output waveguide 70. If there is no optical signal in input waveguide 61 at this time, then no corresponding output pulse will appear on output waveguide 70. To simplify the present description, it will be assumed that optical signals, in the sense of optical energy, are present at all inputs, it being understood that, in a more general sense, an optical signal may comprise either the presence or absence of optical energy.

After the creation of an output pulse at switch 71, the output pulse proceeds to the left along output waveguide 70, and the electrical pulse also continues traveling to the left along electrodes 66 and 68. In most practical integrated optic systems, the velocity of the optical pulse will be greater than that of the electrical pulse. For example, typical values in lithium niobate are 0.43c for the velocity of an optical signal and 0.18c for the velocity of an electrical pulse, where c is the velocity of light in a vacuum. The electrical pulse therefore reaches the vicinity of switch 72 after the output pulse from switch 71 has passed through switch 72 on output waveguide 70. The presence of the electrical pulse at switch 72 couples the optical signal on input waveguide 62 onto output waveguide 70. This process continues for input waveguides 63 and 64. The result, appearing at the left-hand end of output waveguide 70, are a series of four pulses (or time slots in which no pulses appear) arranged in serial order with the pulse from input waveguide 61 first and the pulse from input waveguide 64 last. It will be appreciated that pulse generator 74 could initiate a subsequent parallel-to-serial conversion, by generating a subsequent electrical pulse on electrodes 66 and 68, prior to the complete generation of the preceding serial pulse train. It will also be appreciated that in an implementation in which the velocity of the electrical pulse exceeded the velocity of the optical pulses, then a similar result would be achieved, except that the first serial output pulse on output waveguide 70 would be the pulse from input waveguide 64, with the last serial output pulse being derived from input waveguide 61. In general, the time spacing $\tau$ between the serial pulses on output waveguide 70 is given by:

$$\tau = L\left(\frac{1}{V_E} - \frac{1}{V_L}\right) \quad (1)$$

where L is the spacing between adjacent switches; $V_E$ is the velocity of the electrical pulse; and $V_L$ is the velocity of the light pulse. Thus, for the typical velocity values given above, a switch spacing L of 5 mm produces a 50 pico-second time delay between serial pulses, a value suitable for many applications.

Figure 4:
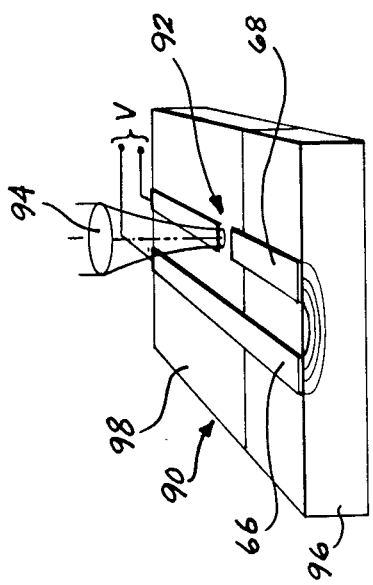
FIG. 4 is a schematic perspective view showing the coupling of an optical pulse to the traveling wave electrodes.

FIG. 4 illustrates a preferred technique for converting the short optical pulse from laser diode 80 into an electrical pulse on electrodes 66 and 68, i.e., a preferred embodiment of pulse generator 76. FIG. 4 illustrates electro-optic substrate 90 comprising lithium niobate crystal 96 butted up against gallium arsenide crystal 98.

Planar, parallel strip electrodes 66 and 68 are formed on crystals 96 and 98 such that electrode 68 includes gap 92 on gallium arsenide crystal 98. The electrodes are connected to a source of potential V. Gap 92 is predeposited with chromium to obtain a Schottky barrier photodiode. A pulse of light from a laser diode (not shown in FIG. 4) is focused by lens 94 onto gap 92, to briefly cause conduction across the gap that results in a pulse traveling down electrodes 66 and 68. Switching speeds of less than a picosecond have been demonstrated with this arrangement. A second suitable technique for coupling the laser diode pulse to the electrodes is the waveguide technique shown in the paper by M. L. McWright et al., *Integrated Optical Circuit Engineering II* Proceedings Spie, Vol. 578, 52 (1985). Such a waveguide technique would allow for integration of the laser diode and photodetector onto a single substrate.

Figure 5:
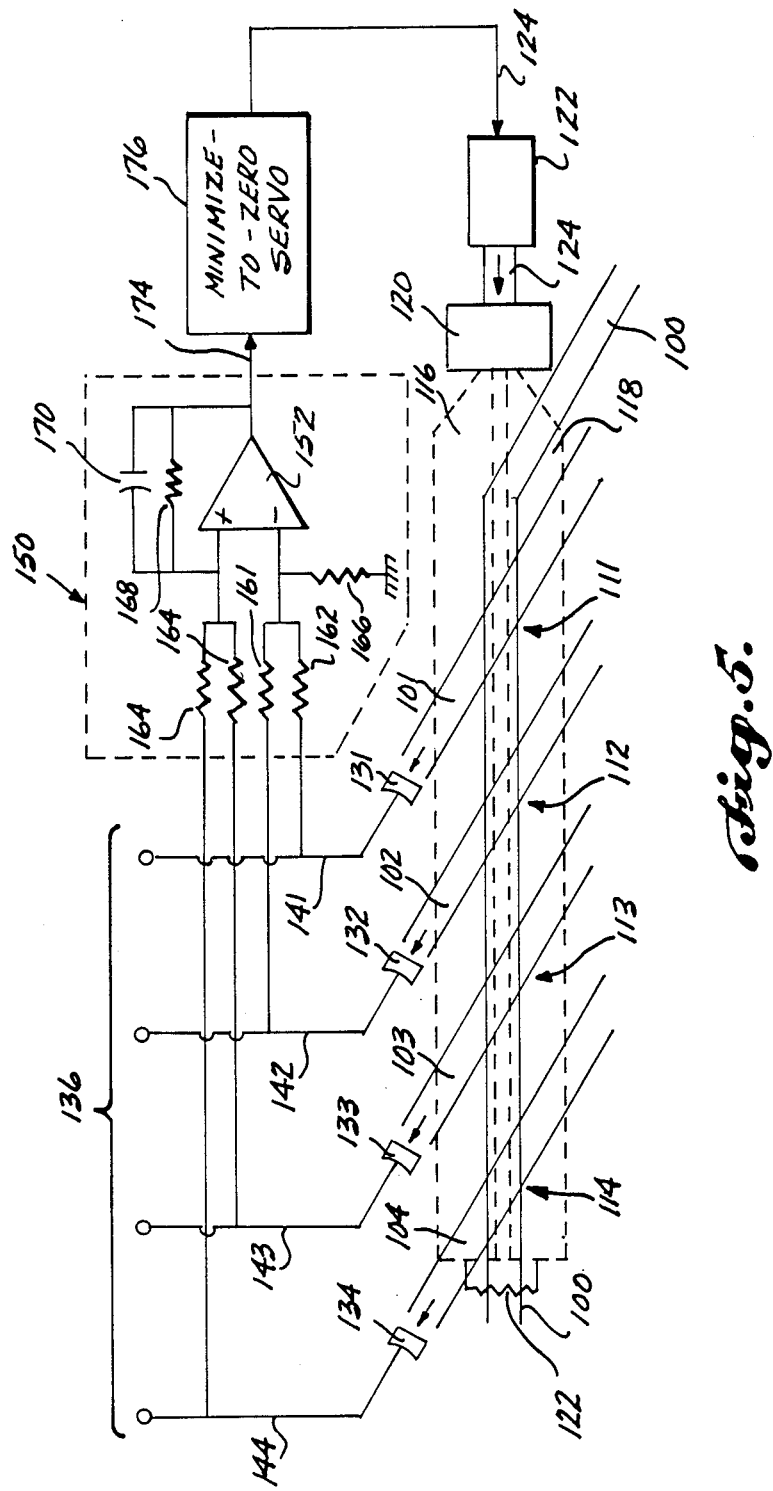
FIG. 5 is a schematic view of a demultiplexer according to the present invention.

A preferred arrangment for a demultiplexer according to the present invention is shown in FIG. 5. The demultiplexer comprises optical input waveguide 100 and four optical output waveguides 101-104. The output waveguides 101-104 intersect input waveguide 100 to form four X-crossing switches 111-114, respectively. Paralleling input waveguide 100 are a pair of traveling wave electrodes 116 and 118 that are coupled to optoelectric pulse generator 120 at one end and that are terminated by terminating resistor 122 at their opposite ends. As with the multiplexer of FIG. 3, pulse generator 120 is coupled to laser diode 122 by optical waveguide 124. However, in the demultiplexer embodiment of FIG. 5, the repetition rate of laser diode 122 is controlled by a repetition rate signal on line 124. The derivation of the repetition rate signal is described below.

The method of operation of the demultiplexer shown in FIG. 5 is similar to the operation of the multiplexer shown in FIG. 3. The demultiplexer operates as a serial in, parallel out (SIPO) converter to convert a serial train of optical pulses on input waveguide 100 into a parallel train of optical pulses on output waveguides 101-104. At a prescribed time in relation to a train of serial input pulses, pulse generator 120 launches an electrical pulse to the left along electrodes 116 and 118. The electrical pulse is timed such that it reaches switch 111 simultaneously with the arrival of the first serial pulse in input waveguide 100. The electrical pulse thereby causes the serial pulse to be diverted into output waveguide 101. This procedure then repeats for output waveguides 102-104. The timing and velocity consideration are identical to those discussed above in connection with equation (1) for the multiplexer of FIG. 3. In particular, if the velocity of the optical pulses exceeds the velocity of the electrical pulse, then the first serial input pulse is coupled to output waveguide 101, and the last serial input pulse is coupled to waveguide 104. However, if the electrical pulse velocity exceeds the velocity of the optical pulses, then the opposite is true, and the last optical pulse is coupled into output waveguide 101, and the first optical pulse is coupled into output waveguide 104.

The proper timing of the electrical pulse produced by pulse generator 120 is controlled by a feedback system that controls the repetition rate signal on line 124. The feedback system includes photodetectors 131-134 that are positioned to receive the optical output pulses on output waveguides 101-104, respectively. The result, in general, is an N bit parallel electrical signal on terminals 136 that may be used in electro-optical data transfer systems. It will be understood that, if it is desired to use the optical signals on output waveguides 101-104 for further processing, photodetectors 130, 131-134 could be arranged to sample rather than terminate the respective optical pulses. The outputs of photodetectors 131-134 are input into difference detector 150. Difference detector 150 comprises differential amplifier 152 that is connected as an integrator to determine the average difference between the electrical signal on lines 141 and 142 on the one hand, and lines 143 and 144 on the other hand. In particular, these signals on line 141 and 142 are coupled to the inverting input terminal of differential amplifier 152 by resistors 161 and 162, respectively. Electrical signals on lines 143 and 144 are coupled to the noninverting input of differential amplifier 152 by resistors 163 and 164, respectively. Resistors 166 and 168 and capacitor 170 provide conventional connections to cause the differential amplifier to act as an integrating difference detector, to produce an output signal on line 174 having an amplitude and sign indicative of the average difference between the signals on lines 141 and 142 versus those on lines 143 and 144. This output signal is input to Minimize-to-Zero Servo 176 that controls the repetition rate signal on line 124. This arrangement insures that pulse generator 120 will remain phase-locked to the stream of optical pulses on input waveguide 100.

Figure 6:
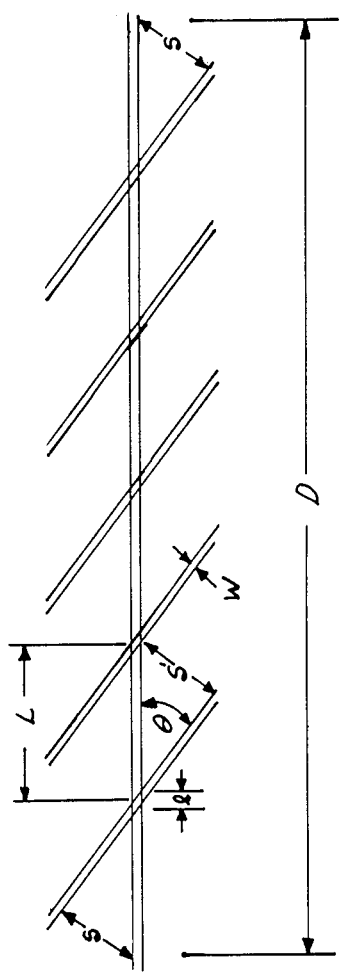
FIG. 6 is a schematic view showing the geometric relationships of a series of X-crossing switches.
Figure 7:
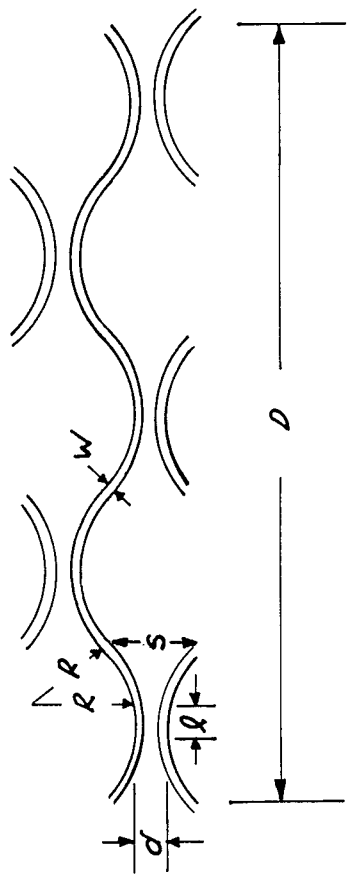
FIG. 7 is a schematic view showing the geometric relationship of a series of directional coupler switches.

FIGS. 6 and 7 illustrate the geometrical relationships involved in constructing series of X-crossing and directional coupler switches. Referring initially to FIG. 6, the parameters W, l, and $\theta$ have meanings identical to those in FIG. 1. The parameter L is the distance between the centers of adjacent switches, the parameter S is the perpendicular spacing between the output ports of a given switch, and the parameter D is the total length of the series of switches. From FIG. 6 it may be seen that the value of D is given by:

$$D = (n+1) \cdot S/(\sin \theta) \qquad (2)$$

where n is the number of switches. Equation (2) can be approximated as follows:

$$D = (n+1) \cdot S/(\tan^{-1}(W/l)) \qquad (3)$$

In FIG. 7, the parameters W, l, R, and d have meetings identical to those described in FIG. 2. It may be seen that for directional coupler switches, the total length D for n switches is given by:

$$D = n(1 + 2\sqrt{R(S-d)}) \qquad (4)$$

Given these relationships, and the parameter of values described above in connection with FIGS. 1 and 2, the X-crossing embodiment shown in FIG. 6 has a length on the order of 28 mm for an eight-channel multiplexer or demultiplexer, while the corresponding directional coupler embodiment of FIG. 8 has a total length of 41 mm. The X-coupling switch embodiment is therefore far superior from a fabrication viewpoint. In addition, the directional coupler configuration shown in FIG. 7 would require a three-electrode drive structure with a thin center electrode. This electrode structure requires a significantly higher drive power than a two-electrode structure, due to the large resistance/capacitance of the center electrode. The directional coupler can be reconfigured to use two electrodes, but only by roughly doubling the length of the device.

While the preferred embodiments of the invention have been illustrated and described, variations will be apparent to those skilled in the art. Accordingly, the invention is not to be limited to the specific embodiments illustrated and described, and the true scope of the invention is to be determined by reference to the following claims.

The embodiments of the invention in which an exclusive property or privilege is claimed are defined as follows:

1. A device for time multiplexing a plurality of parallel optical input signals to produce a serial optical output signal, the device comprising:
   an optical output waveguide;
   a plurality of optical input waveguides, each input waveguide including means for receiving one of the input signals;
   a plurality of optical switches, each optical switch coupling one of the input waveguides to the output waveguide, each optical switch including means for receiving an electrical activation signal which, when present, causes light entering the optical switch through the associated input waveguide to pass through the optical switch into the output waveguide; and,
   activation means for providing activation signals to the optical switches such that input signals on the input waveguides are time multiplexed onto the output waveguide to produce the output signal, the activation means comprising an electrode pair positioned and dimensioned such that each optical switch is adjacent to a different portion of the electrode pair.

2. The device of claim 1, wherein the activation means comprises means for producing an electrical pulse traveling along the electrode, such that the presence of the electrical pulse on the electrode adjacent a given optical switch causes light entering the optical switch through the associated input waveguide to pass through the optical switch into the output waveguide.

3. The device of claim 2, wherein the means for producing the electrical pulse comprises a laser diode for producing an optical pulse and pulse conversion means for receiving the optical pulse and producing the electrical pulse in response thereto.

4. The device of claim 3, wherein the pulse conversion means comprises a gap in the electrode in which a photodiode is fabricated, and means for directing the optical pulse onto the gap.

5. The device of claim 1, wherein the activation means comprises a pair of coplanar traveling wave electrodes extending along the output waveguide adjacent the optical switches.

6. The device of claim 1, comprising at least three input waveguides and at least three corresponding nonblocking optical switches.

7. The device of claim 6, wherein each optical switch is an X-crossing switch.

8. A device for time multiplexing a serial optical input signal into a plurality of parallel optical output signals, the device comprising:
   an optical input waveguide;
   a plurality of optical output waveguides;
   a plurality of optical switches, each optical switch coupling one of the output waveguides to the input waveguide, each optical switch including means for receiving an electrical activation signal which, when present, causes light entering the optical switch through the input waveguide to pass through the optical switch into the associated output waveguide; and,
   activation means for providing activation signals to the optical switches such that the input signal on the input waveguide is time demultiplexed onto the output waveguides to produce the output signals, the activation means comprising an electrode pair positioned and dimensioned such that each optical switch is adjacent to a different portion of the electrode pair.

9. The device of claim 8, wherein the activation means comprises means for producing an electrical pulse traveling along the electrode, such that the presence of the electrical pulse on the electrode adjacent a given optical switch causes light entering the optical switch through the input waveguide to pass through the optical switch into the associated output waveguide.

10. The device of claim 9, wherein the means for producing the electrical pulse comprises a laser diode for producing an optical pulse and pulse conversion means for receiving the optical pulse and producing the electrical pulse in response thereto.

11. The device of claim 10, wherein the pulse conversion means comprises a gap in the electrode in which a photodiode is fabricated, and means for directing the optical pulse onto the gap.

12. The device of claim 8, wherein the activation means comprises a pair of coplanar traveling wave electrodes extending along the input waveguides adjacent the optical switches.

13. The device of claim 8, comprising at least three output waveguides and at least three corresponding nonblocking optical switches.

14. The device of claim 13, wherein each optical switch is an X-crossing switch.

15. The device of claim 8, further comprising means for providing a feedback signal representing the time averaged difference between the output signals on a first group of output waveguides and the output signals on a second group of output waveguides, and servo means for controlling the repetition rate of the activation signal so as to hold the feedback signal at a predetermined level.

* * * * *